(12) United States Patent
Ochoa et al.

(10) Patent No.: US 12,699,179 B2
(45) Date of Patent: Aug. 4, 2026

(54) METHOD FOR GENERATING RADAR PROJECTIONS TO REPRESENT ANGULAR UNCERTAINTY

(71) Applicant: TOYOTA RESEARCH INSTITUTE, INC., Los Altos, CA (US)

(72) Inventors: Charles Christopher Ochoa, Los Altos, CA (US); Arjun Bhargava, San Francisco, CA (US); Chao Fang, Los Altos, CA (US); Kun-Hsin Chen, Los Altos, CA (US); Kuan-Hui Lee, San Jose, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 635 days.

(21) Appl. No.: 17/731,021

(22) Filed: Apr. 27, 2022

(65) Prior Publication Data

US 2023/0350050 A1 Nov. 2, 2023

(51) Int. Cl.
*G01S 13/86* (2006.01)
*G01S 13/89* (2006.01)
*G01S 13/931* (2020.01)

(52) U.S. Cl.
CPC ............ *G01S 13/867* (2013.01); *G01S 13/89* (2013.01); *G01S 13/931* (2013.01)

(58) Field of Classification Search
CPC ....... G01S 13/89; G01S 13/867; G01S 13/931
See application file for complete search history.

(56) References Cited

U.S. PATENT DOCUMENTS

| | | | | |
|---|---|---|---|---|
| 9,599,706 | B2 * | 3/2017 | Zeng ..................... | G01S 13/931 |
| 10,852,419 | B2 * | 12/2020 | Zhong ..................... | B60R 11/04 |
| 11,062,454 | B1 * | 7/2021 | Cohen ..................... | G01S 7/417 |
| 2009/0292468 | A1 * | 11/2009 | Wu ......................... | G08G 1/165 |
| | | | | 342/146 |

(Continued)

FOREIGN PATENT DOCUMENTS

| | | |
|---|---|---|
| WO | 2007096755 | 8/2007 |
| WO | 2019201565 A1 | 10/2019 |

OTHER PUBLICATIONS

Nabati et al., "Radar-Camera Sensor Fusion for Joint Object Detection and Distance Estimation in Autonomous Vehicles," 12th International workshop on Planning, Perception and Navigation for Intelligent Vehicles (PPNIV), pp. 129-134, Oct. 25, 2020 (https://www-sop.inria.fr/members/Philippe.Martinet/proceedings/ProceedingsPPNIV20.pdf).

(Continued)

*Primary Examiner* — Marcus E Windrich
(74) *Attorney, Agent, or Firm* — SHEPPARD, MULLIN, RICHTER & HAMPTON LLP; Daniel N. Yannuzzi

(57) ABSTRACT

The disclosure generally relates to methods for gathering radar measurements, wherein the radar measurements includes one or more angular uncertainties, generating a two dimensional radar uncertainty cloud, wherein the radar uncertainty cloud includes one or more shaded regions that each represent an angular uncertainty, capturing image data, wherein the image data includes one or more targets within a region of interest, and fusing the two dimensional radar uncertainty cloud with the image data to overlay the one or more regions of uncertainty over a target.

23 Claims, 6 Drawing Sheets

(56) References Cited

U.S. PATENT DOCUMENTS

| | | | | |
|---|---|---|---|---|
| 2016/0291145 A1* | 10/2016 | Zeng | ........................ | G01S 7/415 |
| 2016/0291149 A1* | 10/2016 | Zeng | .................... | G01S 13/874 |
| 2017/0371841 A1* | 12/2017 | Hayden | ................ | G06F 17/145 |
| 2018/0059237 A1* | 3/2018 | Liu | ......................... | G01S 13/89 |
| 2018/0074506 A1* | 3/2018 | Branson | ................ | G06V 10/82 |
| 2019/0202453 A1* | 7/2019 | Farooqi | ............... | B60W 40/112 |
| 2019/0258878 A1* | 8/2019 | Koivisto | .............. | B60W 50/00 |
| 2020/0158856 A1* | 5/2020 | Becker | ................. | G01S 13/867 |
| 2021/0158544 A1* | 5/2021 | Steinmeyer | ........... | G01S 13/867 |
| 2021/0208281 A1* | 7/2021 | Trofymov | ............ | G01S 17/931 |
| 2021/0295113 A1* | 9/2021 | Sless | ....................... | G06F 18/25 |
| 2021/0407142 A1* | 12/2021 | Hur | ........................ | H04N 19/30 |
| 2023/0142299 A1* | 5/2023 | Pan | ....................... | G01S 13/867 |
| | | | | 701/301 |

OTHER PUBLICATIONS

Long et al., "Full-Velocity Radar Returns by Radar-Camera Fusion," 2021 International Conference on Computer Vision, pp. 16198-16207, May 2021 (https://doi.org/10.48550/arXiv.2108.10637).

* cited by examiner

METHOD FOR GENERATING RADAR PROJECTIONS TO REPRESENT ANGULAR UNCERTAINTY

TECHNICAL FIELD

The present disclosure relates generally to a method of fusing radar data with image data to represent angular uncertainty of the radar signal.

DESCRIPTION OF RELATED ART

Radar signals have been used in autonomous and non-autonomous vehicles for many years as depth sensors. RADAR stands for (Radio Detection And Ranging). RADAR is so-named based on the technology's use of radio waves. Radars may emit radio waves, a particular type of electromagnetic wave having the longest wavelength. These radio waves, i.e., signals, are emitted as short pulses which may be reflected by objects in their path, in part reflecting back to the radar. Unfortunately, there is some amount of imprecise-ness with the calculated distance, angle, as well as radial velocity of those objects relative to the location of the RADAR. That is, RADAR tends to exhibit some level of angular uncertainty, especially in the vertical direction (explained in greater detail below). As should be understood, this angular uncertainty equates to somewhat imprecise measurements of distance, angle, and radial velocity (or depth in the context of vehicular applications), again, especially in the vertical direction. Thus, when compared to LIDAR (Light Detection and Ranging) cloud points, RADAR cloud points are more uncertain, particularly in autonomous driving configurations. Despite this shortcoming, however, radar is increasingly being used in more point cloud applications. Thus, determining the accuracy of the radar measurement becomes even more important.

BRIEF SUMMARY OF THE DISCLOSURE

In accordance with some embodiments, a method of fusing radar measurements and image data includes: transmitting an radar signal towards a target within a region of interest; gathering radar measurements, wherein the radar measurements include one or more angular uncertainties; generating a radar uncertainty cloud, wherein the radar uncertainty cloud includes one or more shaded regions that represent the one or more angular uncertainties; capturing image data, wherein the image data includes the target; and fusing the radar uncertainty cloud with the image data to overlay the one or more shaded regions of radar uncertainty cloud over the target.

In another embodiment, the method includes: gathering radar measurements, wherein the radar measurements include one or more angular uncertainties; generating a two dimensional radar uncertainty cloud, wherein the radar uncertainty cloud includes one or more shaded regions that each represent an angular uncertainty; capturing image data, wherein the image data includes one or more targets within a region of interest; and fusing the two dimensional radar uncertainty cloud with the image data to overlay the one or more regions of uncertainty over a target.

In yet another embodiment the method includes: transmitting one or more radar signals toward one or more targets within a region of interest; gathering radar measurements regarding the approximate location of each electromagnetic wave, wherein the radar measurements includes one or more angular uncertainties for each radar signal; generating an radar uncertainty cloud for each radar signal, wherein each radar uncertainty cloud includes one or more shaded regions that each represent one or more angular uncertainties of each radar signal; capturing image data, wherein the image data includes the one or more targets; and fusing each radar uncertainty cloud with image data from each target to display the one or more regions of uncertainty for each radar signal over each target.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

DETAILED DESCRIPTION

Figure 1:
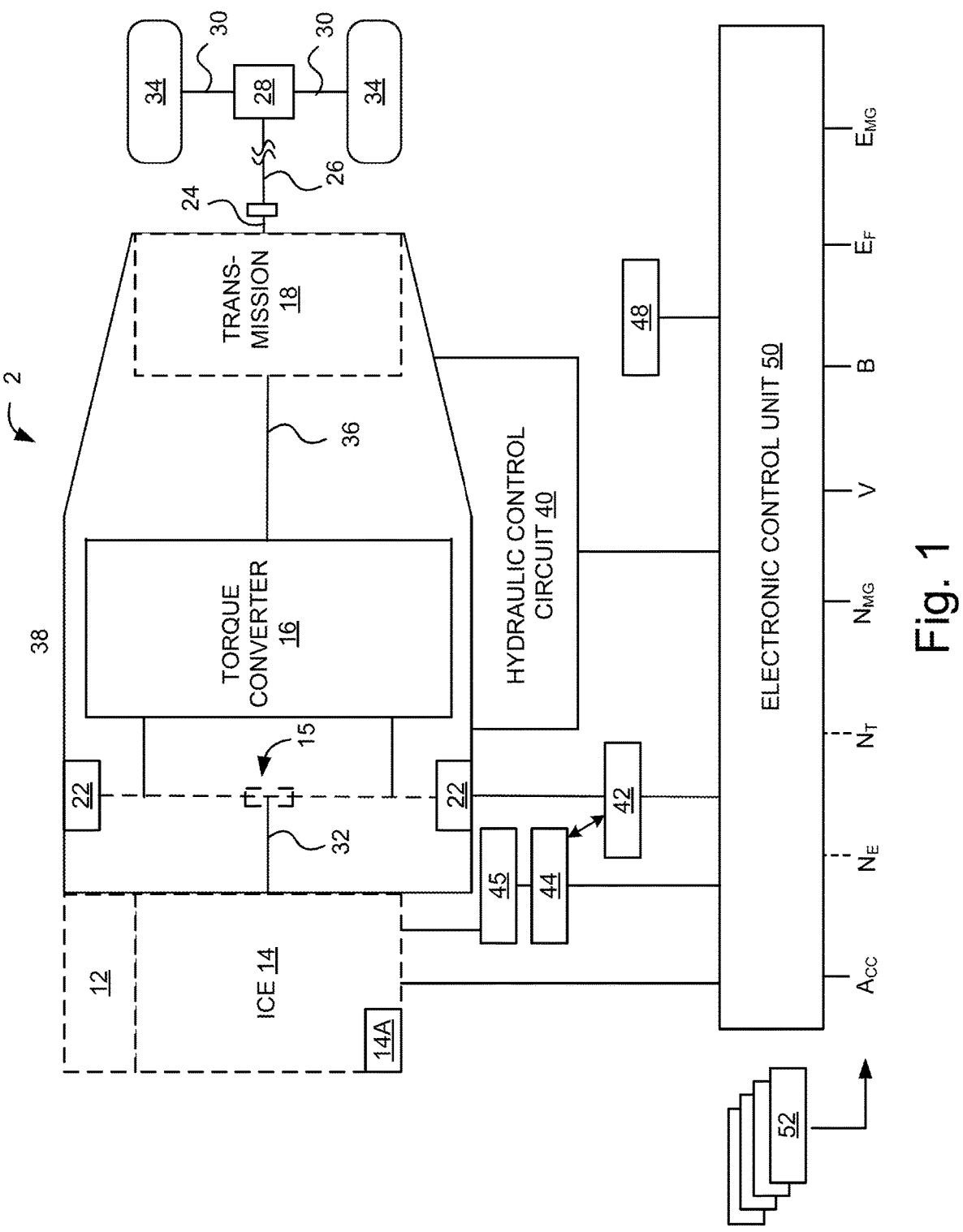
FIG. 1 is a schematic representation of an example hybrid vehicle with which embodiments of the systems and methods disclosed herein may be implemented.

Both autonomous and non-autonomous vehicles use radar for object detection. For example, most automotive systems use various frequency modulated continuous wave (FMCW) systems for adaptive cruise control, and emergency brake assist operations. Typical automotive radar systems use vertical polarization schemes to transmit one or more radar pulses towards one or more targets. The reflected signal is captured by a receiver and subsequently analyzed by a radar system to determine various parameters relating to the automobile and the target.

However, vertical polarization has a large azimuth that creates one or more angular uncertainties in the gathered radar measurements. This is problematic for radar systems that use radar measurements to generate point clouds of specific targets. Some prior methods have tried to solve this problem by projecting the radar points as vertical line segments. However, projecting radar points in as a vertical line requires that a controller determine the extent of the vertical height of the radar points (e.g., 1 meter, 2 meters, 3 meters). Furthermore, the controller would have to determine where the vertical line starts in real world applications. For example, the controller may assume that the vertical line starts from the road surface and extends vertically 2 or 3 meters, however, to gather an accurate measurement, the controller must also determine the height of the road surface. Unlike the vertical line segments, in this example, our system does not need the road surface height, and is not limited by a specific vertical height. Our system uses multiple points and knowledge of the distribution shape to create a data driven determination of where the cloud point may be.

Thus, in accordance with various embodiments of the technologies disclosed herein, systems and methods of camera-radar fusion may comprise gathering radar measurements (i.e., data) along with image data. The result may be a fused image made up of both the image data (from a camera(s) and the radar measurements) to create a radar uncertainty cloud that includes an overlay of the uncertain portions of the radar measurements over an image containing some target object within a region of interest (ROI) captured by the camera For example, in one embodiment, a radar point cloud includes a representation of one or more angular uncertainties in radar measurements that can be combined with a camera-based image. In some embodiments, the radar point cloud will be represented as an ovoid representation. Thus, the uncertainty of the radar signal in relation to a target is represented. Furthermore, the fused camera-radar image can be used in downline processes that include autonomous and semi-autonomous driving applications. In one embodiment, the fused camera-radar image 401 is used in a downline process that includes a computational neural network (CNN). Here, the CNN fused camera-radar image 401 is processed with known CNN architectures. The fused camera-radar image 401 assists the CNN in processing the gathered data. Thereby improving image based neural network tasks that include object detection, object tracking, object velocity estimation, and semantic segmentation.

In one embodiment, the radar-image fusion system includes one or more sensors to capture image data, one or more sensors to capture radar measurements, and a processor having instructions stored thereon that when executed cause the processor to: generate a two dimensional (2D) radar cloud that displays one or more angular uncertainties, and fuse the radar measurements with image data to create a fused-camera radar image.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 2 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 2. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_v$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 2 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc. Sensors 52 may also include camera, LIDAR, and other sensor types configured to detected environmental conditions external to a vehicle. For instance, camera sensors may be configured to detected an obstacle in the path of the vehicle.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

FIG. 1 is provided for illustration purposes only as an example of a vehicle system with which embodiments of the disclosed technology may be implemented. One of ordinary skill in the art reading this description will understand how the disclosed embodiments can be implemented with vehicle platforms.

Figure 2:
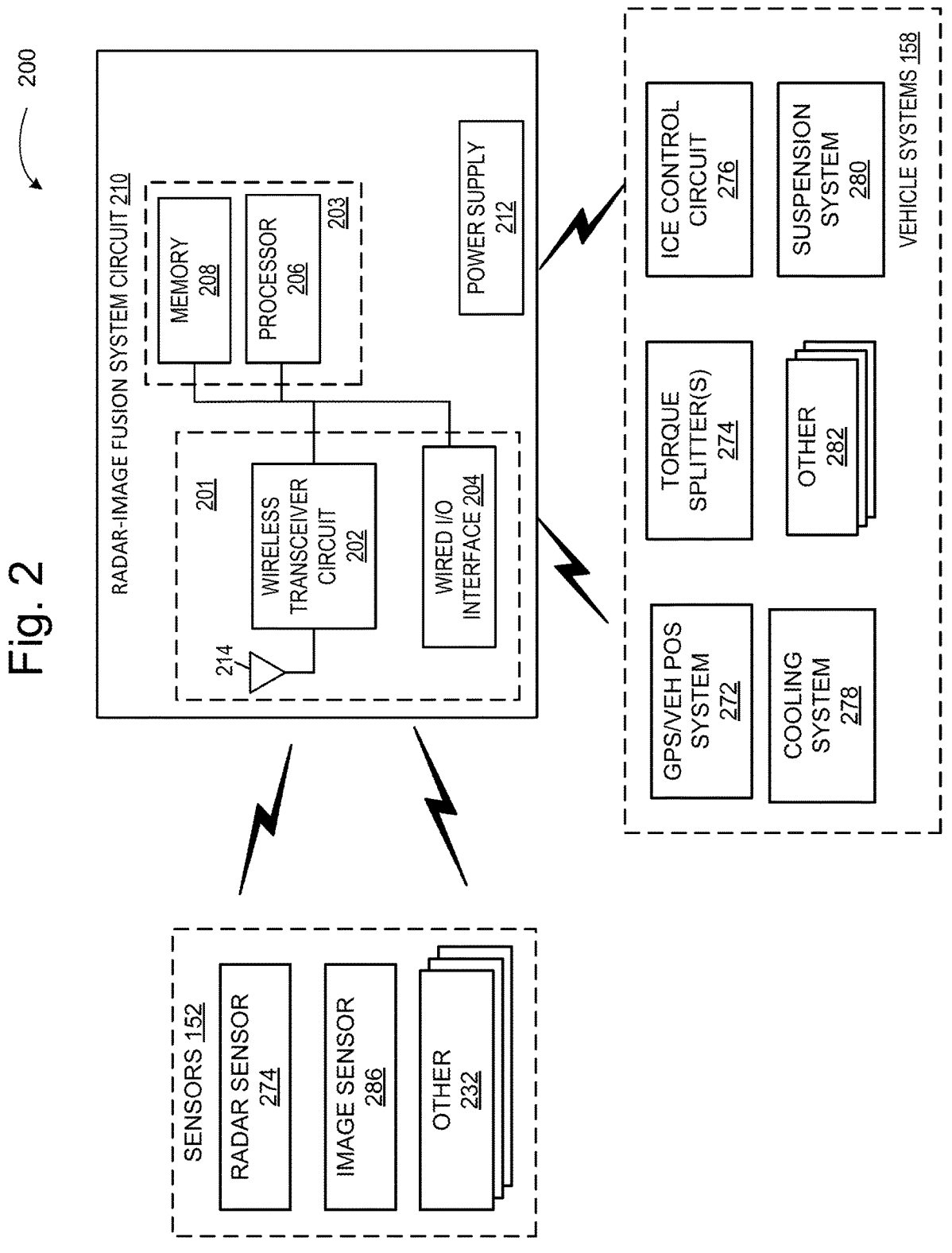
FIG. 2 illustrates an example architecture for generating the fused camera-radar image in accordance with one embodiment of the systems and methods described herein.

FIG. 2 illustrates an example architecture for the radar-image fusion system 200 in accordance with one embodiment of the systems and methods described herein. Referring now to FIG. 2, in this example, the radar-image fusion system 200 includes a radar-image fusion system circuit 210, a plurality of sensors 152, and a plurality of vehicle systems 158. Sensors 158 and vehicle systems 158 can communicate with the radar-image fusion circuit 210 via either a wired or wireless communication interface. Although sensors 152, and vehicle system 158 are depicted as communicating with the radar-image fusion system circuit 210, they can also communicate with each other as well as with other vehicle systems. In one embodiment, the radar-image fusion system circuit 210 can be implemented as an ECU or as part of an ECU such as, for example electronic control unit 50. In another embodiment, the radar-image fusion system circuit 210 can be implemented independently of the ECU.

The radar mapping system circuit 210 in this example includes a communication circuit 201, a decision circuit (including a processor 206 and memory 208 in this example) and a power supply 212. Components of the radar-image fusion system circuit 210 are illustrated as communicating with each other via a data bus, although other communication in interfaces can be included.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to the radar-image fusion system circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up the radar-image fusion system circuit 210.

Communication circuit 201 may comprise either or both a wireless transceiver circuit 202 with an associated antenna 214 and a wired I/O interface 204 with an associated hardwired data port (not illustrated). As this example illustrates, communications with the radar-image fusion system circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by radar-image fusion system circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152, and vehicle system 158. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and NiH₂, to name a few, whether rechargeable or primary batteries,), a power connector (e.g., to connect to vehicle supplied power, etc.), an energy harvester (e.g., solar cells, piezoelectric system, etc.), or it can include any other suitable power supply.

In one embodiment, sensors 152 include, sensors 52 as described above with reference to the example of FIG. 1. Sensors 52 can include additional sensors that may or not otherwise be included on a standard vehicle, such as vehicle 2, with which the radar-image fusion system 200 is implemented. In one example, sensors 152 include vehicle acceleration sensors, vehicle speed sensors, wheelspin sensors (e.g., one for each wheel), a tire pressure monitoring system (TPMS), accelerometers such as a 3-axis accelerometer to detect roll, pitch and yaw of the vehicle, vehicle clearance sensors, left-right and front-rear slip ratio sensors, and environmental sensors (e.g., to detect salinity or other environmental conditions). Additional sensors can also be included as may be appropriate for a given implementation of the radar-image fusion system 200. For example, sensors 152 may also include sonar, lidar, and/or camera sensors configured to detected external vehicle conditions, such as, for example, an obstacle in the presence of the vehicle.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 they can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, and other vehicle systems.

During operation, radar-image fusion system circuit 210 can receive information from various vehicle sensors to prepare/refine a localization packet. Communication circuit 201 can be used to transmit and receive information between radar-image fusion system circuit 210 and sensors 152, and radar-image fusion system circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining whether to prepare/refine a localization packet. Additionally, communication circuit 201 can be used to send an activation signal or other activation information to various vehicle systems 158 as part of preparing and/or refining a localization packet. A localization packet may be prepared/refined based on information detected by one or more vehicles sensors 152.

Specifically, a vehicle may be equipped with cameras 160. These may include front facing cameras 264, side facing cameras 266, and rear facing cameras 268. Cameras may capture information which may be used in preparing and/or refining a localization estimate. For example, a front facing camera 264 may capture the license plate of a proximate vehicle in front of a vehicle equipped with front facing camera 264. Additionally, sensors may estimate proximity between vehicles. For instance, in addition to capturing the license plate/license plate information, the camera may be used with and/or integrated with additional sensors such as LIDAR sensors or any other sensors capable of capturing a distance.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

As explained in further detail below, in one embodiment, the method of FIG. 6 can be implemented using the radar-image system 200. Specifically, in one embodiment, activities 602-610 can be implemented and/or practically performed using the system architecture described in FIG. 2. As found in FIG. 6, the method 600 includes transmitting a radar signal towards a target, gathering radar measurements, capturing image data, generating a radar uncertainty cloud displaying one or more angular uncertainties and fusing the radar uncertainty cloud with image data to create a fused camera-radar image. Furthermore, in another embodiment, other radar channels can be fused into the image. For example, once the approximate location of a point is determined, features like velocity or radar cross section can be included in the fused image.

Figure 3:
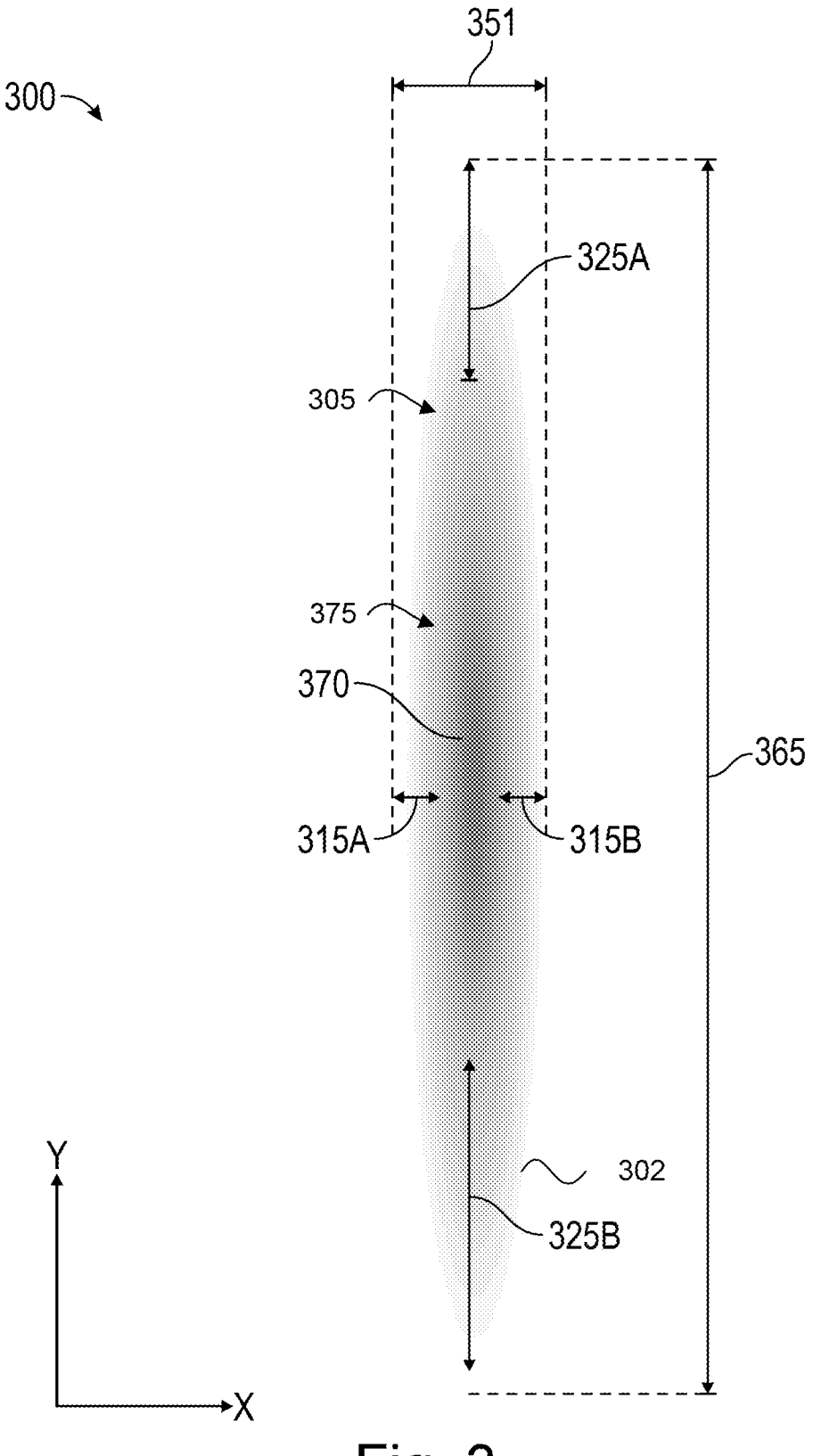
FIG. 3 is an example illustration of a two dimensional (2D) radar uncertainty cloud, according to one embodiment.

FIG. 3 is an example illustration of a two dimensional (2D) radar uncertainty cloud along an X, Y axis, according to one embodiment. In another embodiment, the radar uncertainty cloud 300 includes a three dimensional (3D) cloud along the X, Y, and Z axis. Here, the radar uncertainty cloud 300 represents the relative certainty of the radar measurement in space. As explained in further detail in FIG. 4, the radar uncertainty cloud 300 is overlaid onto an image containing a target object to create a fused camera-radar image 401 that represents the angular uncertainty of the radar measurement in relation to the target.

As seen in FIG. 3, the radar uncertainty cloud 300 includes a region of signal uncertainty 302 about the approximate center point 370 of the radar measurement. In this example, the region of signal uncertainty 302 creates an oval. The region of uncertainty 302 includes an outer region of signal uncertainty 305 and an inner region of signal uncertainty 375. The outer region of signal uncertainty 305 represents a region of greater signal uncertainty. The outer signal uncertainty region 305 includes an upper vertical region 325A, a lower vertical region 325B, a leftmost horizontal region 315A, and a rightmost horizontal region 315B. In this example, the length of the leftmost horizontal region 315A and the rightmost horizontal region 315B is less than the length of the upper vertical region 325A and the lower vertical region 325B. Typical radar clouds include a horizontal region 351 having a length shorter than the vertical length. The inner region of signal uncertainty 375 represents a region of less signal uncertainty (i.e., greater signal certainty).

Furthermore, in this example, the darker pixels in the oval indicate the region of greater certainty (i.e., the inner region of signal uncertainty 375), while the light bluish pixels indicate greater uncertainty (i.e., the outer region of signal uncertainty 305). Thus, in this example, the certainty of the central point 370 is greatest in the darker regions.

Figure 4:
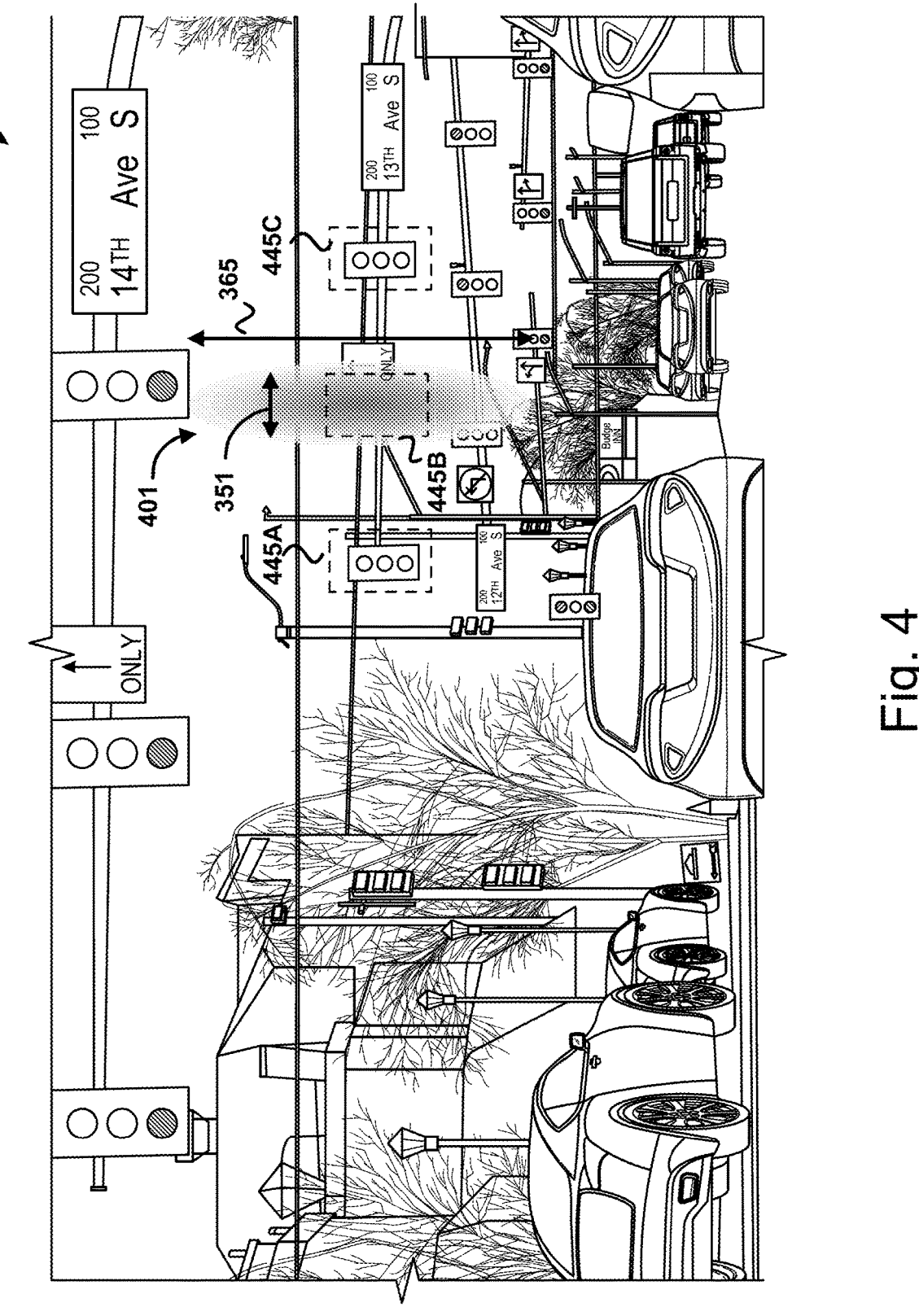
FIG. 4 is an example illustration of a fused camera-radar image, according to one embodiment.

FIG. 4 is an example illustration of a fused camera-radar image, according to one embodiment. The illustration includes an example environment 400 in which the radar-imaging system 200 may be used. In this example, the environment 400 includes one or more regions of interest (ROI) 445A-445C. Each ROI is bounded by a two dimensional (2D) bounding box that includes two horizontal boundaries and two vertical boundaries on an X-Y plane. The ROI 445B (e.g., traffic light) further includes a target 405 (e.g., yellow signal light).

In one embodiment, the radar-image fusion systems uses a radar-camera fusion algorithm to fuse radar point clouds and captured images to generate a fused camera-radar image by mapping radar measurements to an image plane to improve the cloud point accuracy. Each target is represented as a 3D anchor. The center point for each anchor is obtained from the radar detection's position in the vehicle coordinates. The 3D anchors are mapped to the image plane and converted to equivalent 2D bounding boxes by finding the smallest enclosing box for each mapped anchor. Since every 3D proposal is generated from a radar detection, it has an accurate distance associated with it. This distance is used as the proposed distance for the generated 2D bounding box.

In one embodiment, the radar measurements and image are fused by re-sampling. Here, an individual radar point p is drawn from a distribution F centered at p. With assumption about F taken from the physics of the radar sensor, learned, or just assumed to be normally distributed, the system 200 can sample N copies of point p from the distribution F. The system 200 can then accumulate the projections of the samples of p onto the image plane. For example, if two samples overlap on the image plane, the rendered value is 2, if three samples overlap on the image plane, the rendered value is 3. If no samples overlap on the image plane, the value is 1. The system 200 then normalizes the projection by the total number of points to obtain a 2D image containing the 2D spatial probabilities of point p.

In another embodiment, the system 200 uses a closed form mathematical formula for the distribution F. Here the system 200 starts by selecting a pixel in the image plane and calculating a ray formed by the camera center that is passed through the pixel. The system 200 then selects some range of depth values and integrates the probability implied by F for points along the way. One method is to approximate the distribution F with a normal distribution by assuming a normally distributed noise in angular directions and then calculating a local linear approximation in rectangular. In yet another embodiment, the system 200 can use the distribution F and x, y, z values such that $F(x,y,z) >=$ a threshold value (e.g., 5 percent). The system 200 renders that level sets projection to the image plane with a value of 5 percent. The system 200 then calculates a smaller threshold value (e.g., 10 percent) and renders that on top of the previous image, The system 200 then repeats the process for smaller and smaller threshold values.

By fusing the radar uncertainty cloud 300 with image data containing the target, the radar-image fusion system 200 creates a fused camera-radar image 401 that can be used by downline processes to alter various radar signal parameters. Here, the radar signal data, is captured by one or more sensors and mapped to create the radar uncertainty cloud 300. The radar uncertainty cloud 300 is then overlayed over the image of the target 405 to represent the angular uncertainty of the radar signal in relation to the target.

The image need not be captured by an in-vehicle sensor (e.g., camera). In one embodiment, the image can be captured from a third party source. For example, the image can be captured from a high definition map from a map database. In another embodiment, the image can be captured from another car via V2V communication. For example, a wireless network where vehicles send information to and from each other using dedicated short-range communications to create a mesh network. In yet another embodiment, the image can be captured from a roadside unit via V2I communications. For example, a communication network that exchanges information between vehicles and a roadway system infrastructure. Infrastructure components include road signs, lane markings, traffic lights, and other smart road infrastructure connected via wireless communication.

As seen further in FIG. 4, from the view point of the radar-image fusion system 200, the horizontal position of the central point 370 of the radar signal is generally known (i.e., more certain than the vertical position). However, as evidenced by the longer vertical distance of the radar uncertainty cloud 300, the certainty of the vertical position of the central point 370 is less known (i.e., less certain than the horizontal position). As previously mentioned, he certainty of the central point 370 is greatest in the darker regions of the radar uncertainty cloud 300. By determining the approximate position of the center point of the radar signal in space, downline processes are able to alter various parameters associated with the radar signal to increase the accuracy of the central point of the radar signal in relation to the target.

In an ideal configuration, the central point 370 of the radar signal is the center of the target. However, in most real-world situations, the approximate location of the central point of the radar signal will be above or below the target, thus requiring downline processes to adjust the various parameters associated with the radar signal. By using the fused camera-radar image 401, these downline processes can increase the radar signal accuracy.

For example, by referencing the fused camera-radar image 401, a controller is able to determine the accuracy of the radar signal, and adjust the orientation of the radar signal to improve the accuracy of the radar signal in relation to a target. Thus, if the controller determines, using the fused camera-radar image 401, that there is a high likelihood that the center point of the radar signal is not within the ROI necessary to properly capture the target, the controller can adjust the angle of delivery of the signal to better capture the target. For example, it is foreseeable that a downline process includes a controller that uses the fused camera-radar image 401 to determine that the optimal angle (in an X-Y plane) to capture the target is 35% from horizontal, instead of 45 degrees. Thus, by determining the approximate position of the center point of the signal in space, the controller is able to adjust the transmitted signal to increase the accuracy of the signal reaching the target.

Figure 5:
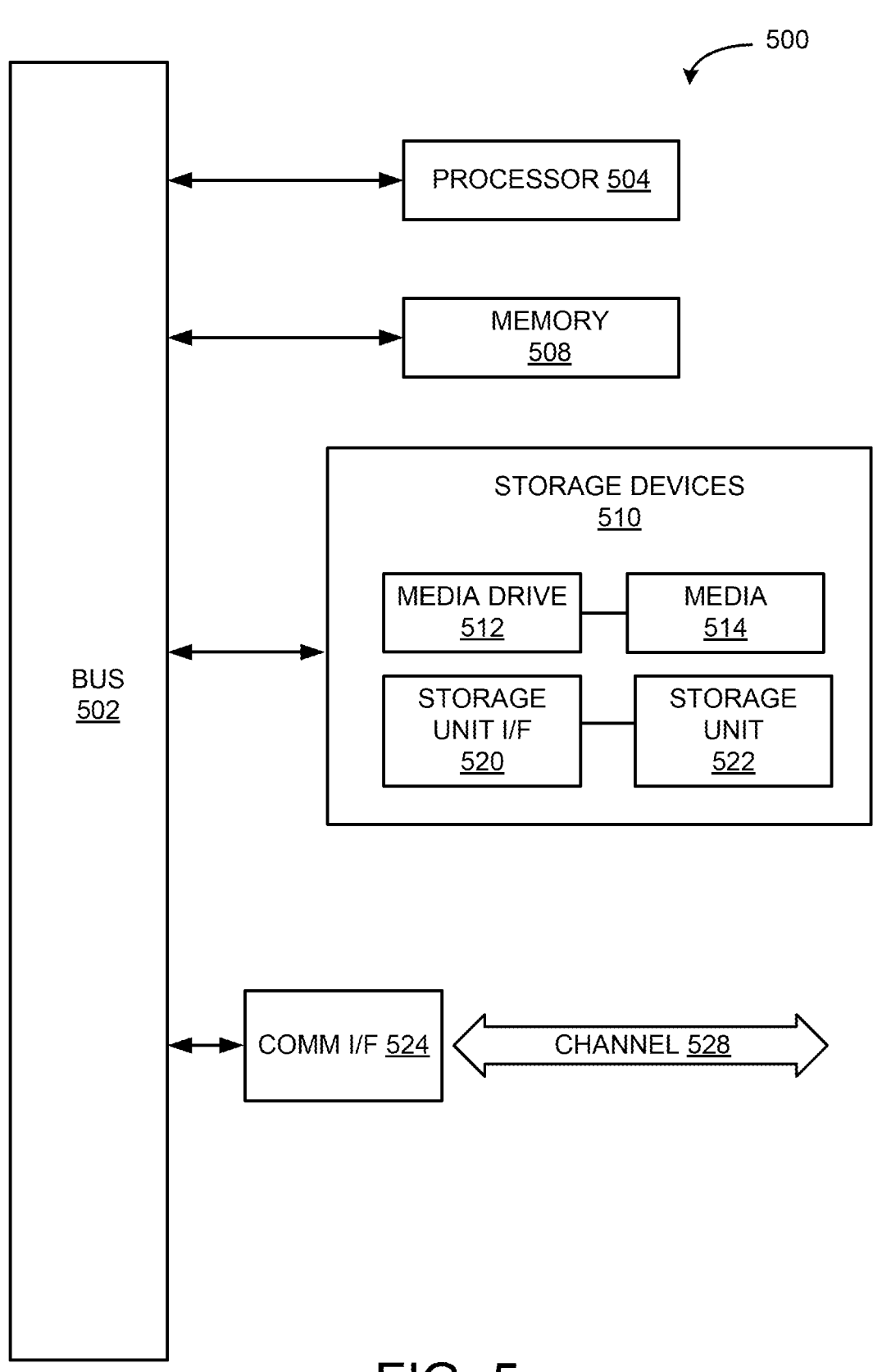
FIG. 5 is an example computing component that may be used to implement various features of embodiments described in the present disclosure.

FIG. 5 is an example computing component that may be used to implement various features of embodiments described in the present disclosure. Where components are implemented in whole or in part using software the software elements can be implemented to operate with a computing or processing component capable of carrying out the functionality described with respect thereto. One such example computing component is shown in FIG. 2. Various embodiments are described in terms of this example-computing component 500. After reading this description, it will become apparent to a person skilled in the relevant art how to implement the application using other computing components or architecture.

Here, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up a user device, a user system, and a non-decrypting cloud service. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

Figure 6:
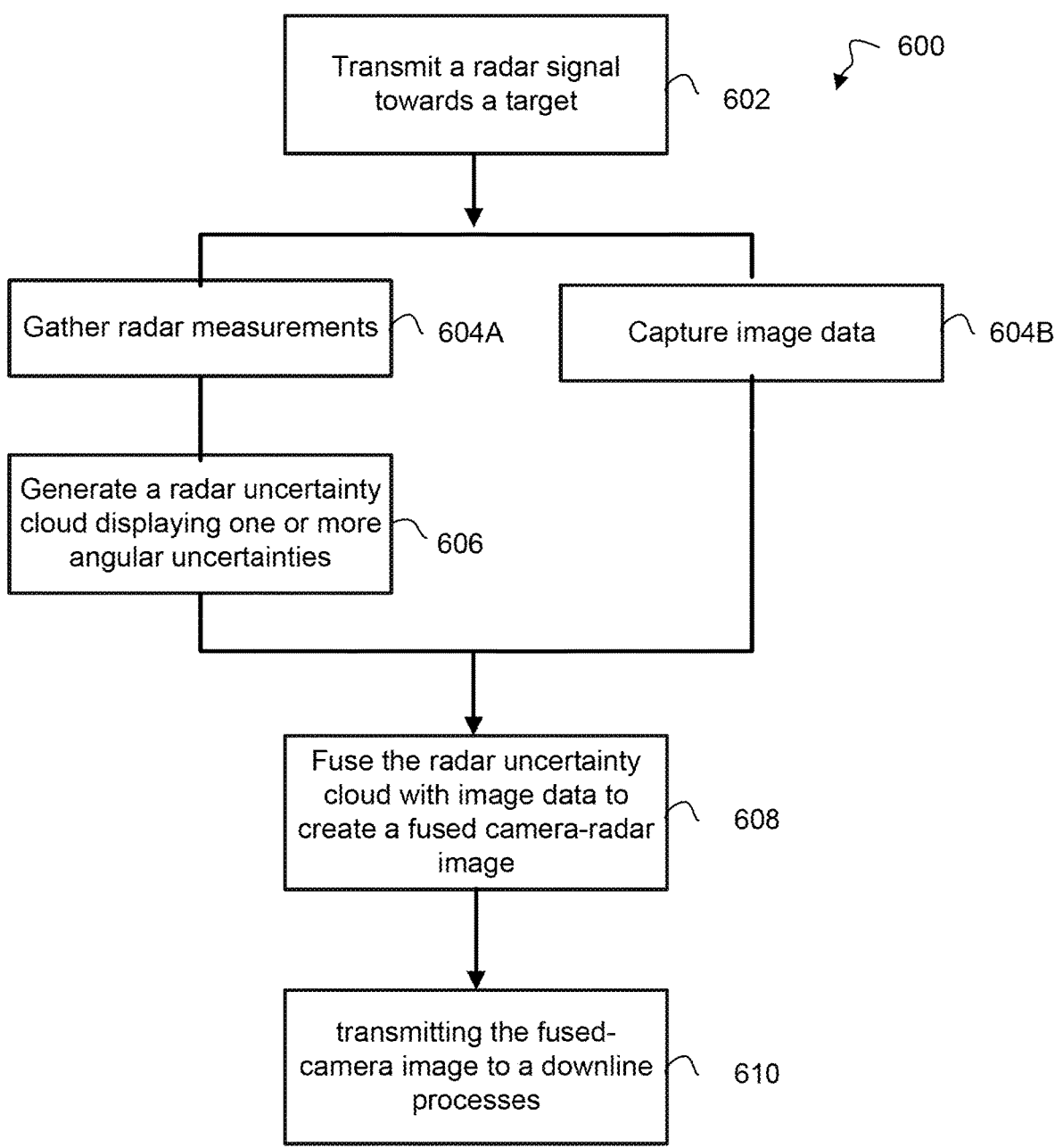
FIG. 6 is an example of a method of generating a fused radar uncertainty image, according to one embodiment The figures are not exhaustive and do not limit the present disclosure to the precise form disclosed.

FIG. 6 is a flow diagram showing an example of a method 600 of using the radar-image fusing system 200. The method 600 includes transmitting a radar signal towards a target, gathering radar measurements, capturing image data, generating a radar uncertainty cloud that includes one or more angular uncertainties, fusing the radar uncertainty cloud with image data to create a fused camera-radar image, and transmitting the fused camera-radar image to a downline process.

At activity 602, the method 600 includes transmitting a radar signal towards a target. Typical radar systems send out narrow beams of electromagnetic radio waves in pulses via a transmitting antenna ("transmitter"). These waves (i.e., radio signals) bounce off targets and are gathered by a receiving antenna ("receiver").

Activity 604A, the method 600 includes gathering radar measurements. In one embodiment, the radar measurements are gathered using one or more radar sensors 274. The gathered radar measurements include one or more angular uncertainties. The gathered radar measurements are sent from the one or more radar sensors 274 to the radar-image fusion system circuit 210. The radar measurements are received by the radar-image fusion system circuit 210 and stored in memory 208.

At activity 604B, the method 600 includes capturing image data. The image data is captured by one or more image sensors 286, and sent to the radar-image fusion system circuit 210. The image data is received by the radar-image fusion system circuit 210, and stored in memory 208. In one embodiment, the captured image data and/or radar measurements are stored in memory within the vehicle. In another embodiment, the captured image data and/or radar measurements are sent to a server in a remote location outside of the vehicle (e.g., a data center).

Here, the captured image data includes one or more regions of interest (ROI). Each ROI includes one or more targets. For example, in one embodiment, the ROI includes a traffic signal, and the target includes the green, yellow and/or red light fixture within the traffic signal. In one embodiment, image data includes individual frames of a video stream.

At activity 606, the method 600 includes generating a two dimensional (2D) radar uncertainty cloud 300 that includes the one or more angular uncertainties. Here, the radar measurement and the image data is used by the radar-image fusion system circuit 210 to create a (2D) radar uncertainty cloud 300. As seen in FIG. 3, the radar measurement is displayed as a 2D radar uncertainty cloud that includes the one or more angular uncertainties. In one embodiment, the method 600 includes generating a three dimensional (3D) uncertainty cloud that displays the one or more angular uncertainties.

At activity 608, the method 600 includes fusing the radar uncertainty cloud 300 with image data to create a fused camera-radar image 401. Here, the radar image fusion system 200 uses the gathered radar measurements and the captured image data to create a radar uncertainty image. In one embodiment, the radar-image fusion systems uses a radar-camera fusion algorithm to fuse radar point clouds and captured images to generate a fused camera-radar image by mapping radar measurements to an image plane to improve the cloud point accuracy. Each target is represented as a 3D anchor. The center point for each anchor is obtained from the radar detection's position in the vehicle coordinates. The 3D anchors are mapped to the image plane and converted to equivalent 2D bounding boxes by finding the smallest enclosing box for each mapped anchor. Since every 3D proposal is generated from a radar detection, it has an accurate distance associated with it. This distance is used as the proposed distance for the generated 2D bounding box.

In one embodiment, the radar measurements and image are fused by re-sampling. For example, an individual radar point P is drawn from a distribution F centered at P. For example, with an assumption about F taken from the physics of the radar sensor, learned, or just assumed to be normally distributed, the system 200 can sample N copies of point P from the distribution F. The system 200 can then accumulate the projections of the samples of P onto the image plane. For example, if two samples overlap on the image plane, the rendered value is 2, if three samples overlap on the image plane, the rendered value is 3. If no samples overlap on the image plane, the value is 1. The system 200 then normalizes the projection by the total number of points to obtain a 2D image containing the 2D spatial probabilities of point P.

In another embodiment, the system 200 uses a closed form mathematical formula for the distribution F. For example, the system 200 starts by selecting a pixel in an image plane and calculating a ray formed by the camera center that is passed through the pixel. The system 200 then selects some range of depth values and integrates the probability implied by F for points along the way. One method is to approximate the distribution F with a normal distribution by assuming a normally distributed noise in angular directions and then calculating a local linear approximation in rectangular. In yet another embodiment, the system 200 can use the distribution F and x, y, z values such that $F(x,y,z) >=$ a threshold value (e.g., 5 percent). The system 200 renders that level set's projection to the image plane with a value of 5 percent. The system 200 then calculates a smaller threshold value (e.g., 10 percent) and renders that on top of the previous image, The system 200 then repeats the process for smaller and smaller threshold values.

At activity 610, the method 600 includes transmitting the fused camera-radar image to a downline process to adjust one or more parameters of the radar signal in relation to one or more targets. The downline processes can use the radar measurements to implement various autonomous and semi-autonomous systems. Autonomous and semi-autonomous systems include systems that execute driving/assistive driving operations such as acceleration, deceleration, and/or steering of a vehicle, without depending or relying on driving operations/directions by the driver or operator of the vehicle. For example, adaptive cruise control (ACC) can use radar measurements to adjust the vehicle's speed. In addition, lane assist (LKA) can use radar measurements to keep the vehicle within a desired lane.

In one embodiment, the fused camera-radar image 401 is used in a downline process that includes a computational neural network (CNN). Here, the CNN fused camera-radar image 401 is processed with known CNN architectures. The fused camera-radar image 401 assists the CNN in processing the gathered data. Thereby improving image based neural network tasks that include object detection, object tracking, object velocity estimation, and semantic segmentation.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of fusing radar measurements and image data comprising:

transmitting a radar signal towards a target within a region of interest;

gathering radar measurements, wherein the radar measurements include one or more angular uncertainties;

generating a radar uncertainty cloud representing uncertainty of the radar signal in relation to the target using probabilistic data correlated to an angle of signal delivery, wherein the radar uncertainty cloud includes one or more shaded regions that represent the one or more angular uncertainties;

capturing image data, wherein the image data includes the target; and fusing the radar uncertainty cloud with the image data by resampling the radar measurements and normalizing overlapping radar measurements to overlay the one or more shaded regions of the radar angular uncertainty cloud over the target.

2. The method of claim 1, wherein the one or more shaded regions include an outer region of uncertainty and an inner region of uncertainty.

3. The method of claim 2, wherein the inner region of uncertainty includes radar measurements indicative of a center of a radar point cloud.

4. The method of claim 3, wherein the outer region of uncertainty includes radar measurements less indicative of the center of the radar point cloud compared to the inner region of uncertainty.

5. The method of claim 2, wherein the inner region of uncertainty is represented in a two dimensional cloud as a first shaded region, and the outer region of uncertainty is represented in the two dimensional cloud as a second shaded region.

6. The method of claim 5, wherein the first shaded region is darker than the second shaded region.

7. The method of claim 5, wherein the radar uncertainty cloud extends outwardly in a first direction for a first length and outwardly in a second direction for a second length, wherein the first direction and second direction are generally perpendicular.

8. The method of claim 7, wherein the first length is greater than the second length.

9. A method of fusing radar measurements and image data comprising:

transmitting a radar signal towards a target within a region of interest;

gathering radar measurements, wherein the radar measurements include one or more angular uncertainties;

generating a two dimensional radar uncertainty cloud representing uncertainty of the radar signal in relation to the target using probabilistic data correlated to an angle of signal delivery, wherein the two-dimensional radar uncertainty cloud includes one or more shaded regions of uncertainty that each represent one of the one or more angular uncertainties;

capturing image data, wherein the image data includes one or more targets within a region of interest; and fusing the two-dimensional radar uncertainty cloud with the image data by resampling the radar measurements and normalizing overlapping radar measurements to overlay the one or more shaded regions of angular uncertainty over one or more targets.

10. The method of claim 9, wherein the two dimensional radar uncertainty cloud includes an outer region of uncertainty and an inner region of uncertainty.

11. The method of claim 10, wherein the inner region of uncertainty includes radar signal data indicative of a center of a vertical portion of a radar point cloud along a y-axis.

12. The method of claim 11, wherein the outer region of uncertainty includes radar measurements less indicative of the center of the vertical portion of the radar point cloud along the y-axis compared to the inner region of uncertainty.

13. The method of claim 10, wherein the inner region of uncertainty is represented in the radar uncertainty cloud as a first shaded region, and the outer region of uncertainty is represented in the radar uncertainty cloud as a second shaded region.

14. The method of claim 13, wherein the first shaded region is darker than the second shaded region.

15. The method of claim 9, wherein the two-dimensional radar uncertainty cloud extends outwardly in a first direction for a first length and outwardly in a second direction for a second length, wherein the first direction and second direction are generally perpendicular.

16. The method of claim 15, wherein the first length is greater than the second length.

17. A method of fusing radar measurements and image data comprising:
   transmitting one or more radar signals toward one or more targets within a region of interest;
   gathering radar measurements regarding an approximate location of each electromagnetic wave, wherein the radar measurements include one or more angular uncertainties for each radar signal;
   generating a radar uncertainty cloud for each radar signal representing uncertainty of the radar signal in relation to the target using probabilistic data correlated to an angle of signal delivery, wherein
   each radar uncertainty cloud includes one or more shaded regions that each represent one or more angular uncertainties of each radar signal;
   capturing image data, wherein the image data includes the one or more targets; and
   fusing each radar uncertainty cloud with image data from each target by resampling the radar measurements and normalizing overlapping radar measurements to display one or more regions of angular uncertainty for each radar signal over each target.

18. The method of claim 17, wherein the one or more angular uncertainties include an outer region of uncertainty and an inner region of uncertainty.

19. The method of claim 18, wherein the inner region of uncertainty includes radar measurements indicative of a center of a vertical portion of a radar cloud along a y-axis.

20. The method of claim 19, wherein the outer region of uncertainty includes radar measurements less indicative of the center of the vertical portion of the radar cloud along the y-axis compared to the inner region of uncertainty.

21. The method of claim 1, wherein fusing the radar uncertainty cloud with the image data is performed to reduce or mitigate at least one of the one or more angular uncertainties for vehicle perception used to operate a vehicular system.

22. The method of claim 9, wherein fusing the two-dimensional radar uncertainty cloud with the image data is performed to reduce or mitigate at least one of the one or more angular uncertainties for operation of a vehicular system.

23. The method of claim 17, wherein fusing each radar uncertainty cloud with image data from each target is performed to reduce or mitigate at least one of the one or more angular uncertainties for vehicle perception used to operate a vehicular system.

* * * * *